United States Patent Office 3,406,324
Patented Oct. 15, 1968

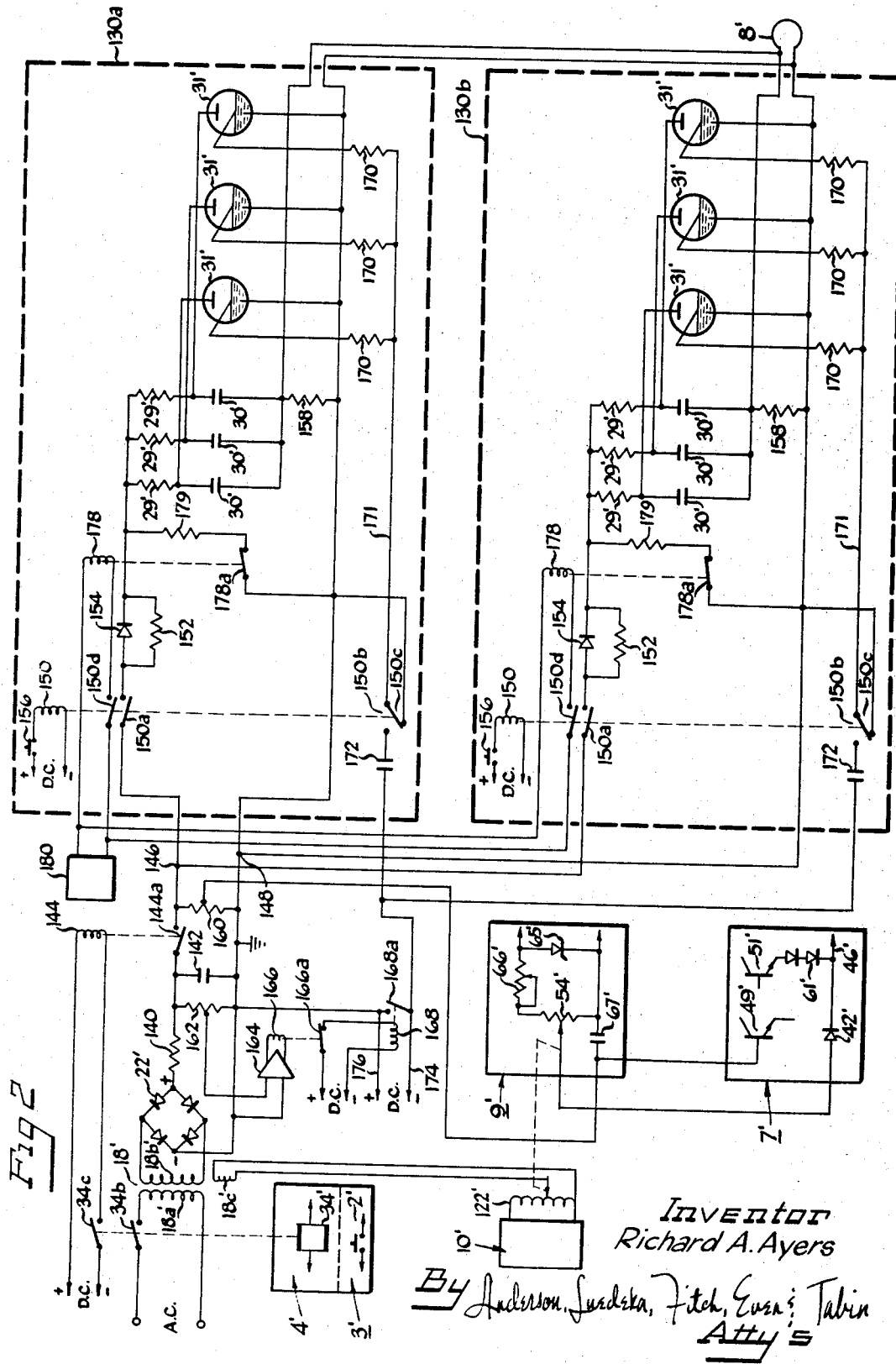

3,406,324
CONDENSER DISCHARGE CONTROL CIRCUIT
Richard A. Ayers, El Cajon, Calif., assignor, by mesne assignments, to Gulf General Atomic Incorporated, San Diego, Calif., a corporation of Delaware
Continuation-in-part of application Ser. No. 311,427, Sept. 25, 1963. This application Sept. 21, 1964, Ser. No. 397,971
19 Claims. (Cl. 320—1)

ABSTRACT OF THE DISCLOSURE

A circuit controls the selective charging and discharging of a capacitor bank, sensing the potential developed thereacross by the energy accumulated therein, and discharging the same through a load when a preselected potential is reached. Means are provided, also responsive to the potential developed across the capacitor bank, for prematurely discharging the same before the energy accumulation exceeds that which can be safely dissipated by the load.

---

This application is a continuation-in-part of application Ser. No. 311,427, filed Sept. 25, 1963, and now abandoned.

This invention relates to control circuits and more particularly to an improved control circuit for effecting and accurately controlling the production of high amperage pulses of current.

United States Patent No. 2,976,907, which issued on Mar. 28, 1961, discloses and claims a feasible method utilizing high amperage pulses of current to produce intense magnetic fields so that work pieces can be formed with various shapes and configurations. When employing this method, a high amperage current pulse is passed through a work piece forming coil as energy is dissipated from an energy storage network. High amperage pulses are also required in electrohydraulic forming wherein spark discharges or exploding wires are employed for forming.

Such techniques and various other advanced experimental and production operations call for a suitable control circuit which is capable of producing high amperage pulses of current. However, previously developed circuits for carrying out this function have not been completely adequate. Such circuits have been bulky and relatively expensive to construct and operate.

Accordingly, it is the prime object of the present invention to provide an improved control circuit that can be utilized to effect the production and selectively control the magnitude of high amperage current pulses that can be utilized in magnetic forming, electrohydraulic forming, and other operations wherein such current pulses are required.

Still another object of the present invention is to provide a control circuit which is adjustable to accommodate selected variations in the instantaneous production and magnitude of the desired high amperage current pulses.

An additional object of the present invention is to provide a control circuit for producing such high amperage pulses of current while at the same time including protective circuitry so that the load whereto the high amperage pulses are supplied is not damaged.

A further object is the provision of a control circuit for producing high amperage pulses of current, which control circuit includes a plurality of modular units.

A more finite object of the present invention is to provide a control circuit for effecting and controlling the production of high amperage pulses of current, which circuit is compact in size, versatile in use, automatic and relatively efficient in operation.

Other objects and advantages of the present invention will become apparent from the following detailed description when considered in conjunction with the accompanying drawings wherein:

FIGURE 2 is a schematic representation of another embodiment of the control circuit.

Figure 1:
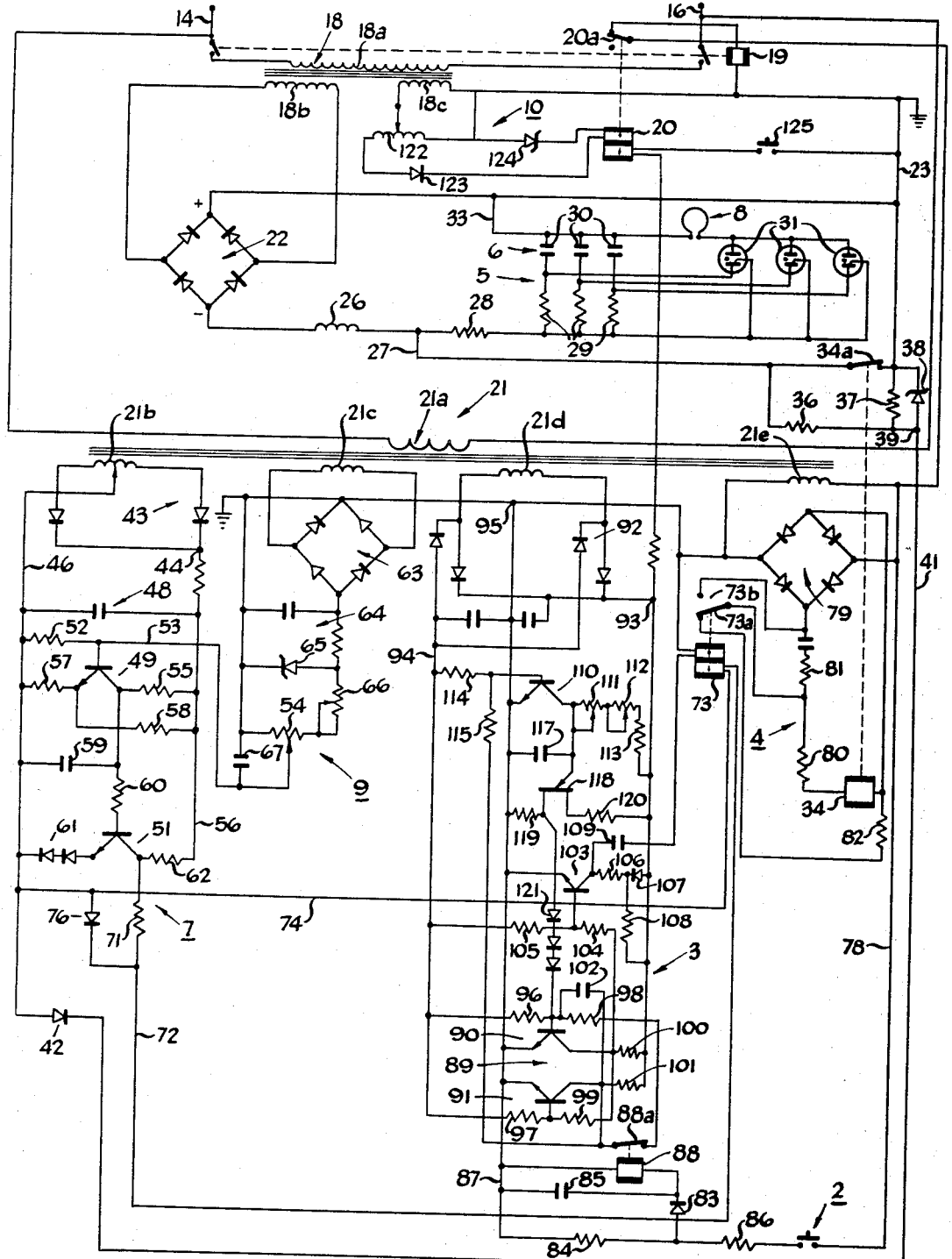
FIGURE 1 is a schematic representation of one embodiment of the control circuit of the present invention.

To facilitate a complete understanding of the control circuit shown in FIGURE 1 of the drawings, a brief description of a typical cycle of operation will be set forth. The control circuit is initially rendered effective by the application of input voltage thereto and the actuation of a push-button operating switch 2. The actuation of the switch 2 energizes a timing circuit 3 which, in turn, actuates a relay circuit 4. Actuation of the relay circuit 4 allows current to be supplied to an energy storage network 5 and the charging of a capacitor bank 6 included therein begins. When the capacitor bank 6 has been charged to a preselected level, a switching network 7 supplies energizing current to the relay circuit 4 which initiates the discharge of the capacitor bank 6 through a low impedance load 8 connected thereto. In this connection, the preset charging level is dictated by biasing conditions established for the switching network 7 by a voltage reference network 9. When the discharge of the capacitor bank 6 has been completed (i.e., the desired high amperage current pulse has been produced), the timing circuit 3 conditions the control circuit for a subsequent cycle of operation. A protective network 10 is provided in the control circuit which, in response to preset conditions, dictates the maximum level of energy which can be dissipated through the load 8, thus ensuring that the load is not subjected to an unsafe level of energy. If a higher energy level tends to be built up in the energy storage network 5, this protective network causes the premature dissipation of the energy before the unsafe level is reached.

Referring in detail to FIGURE 1, a suitable source of alternating current potential (not shown) feeds a pair of main power conductors 14 and 16 that supply operating power to the control circuit. In this connection, the conductors supply an alternating current to a primary winding 18a of a current limiting transformer 18. The secondary windings 18b and 18c supply power to the energy storage network 5 and the protective network 10. The path for input current from the conductors 14 and 16 to the transformer 18 is completed by the contacts of a power contactor 19, which in turn is controlled by a normally closed relay contact 20a of an overvoltage protection relay 20 provided in the protective network 10.

In addition to supplying input current to the transformer 18, the conductors 14 and 16 are connected to and supply current to the primary winding 21a of a transformer 21. The primary winding 21a is coupled to each of a plurality of secondary windings 21b, 21c, 21d and 21e. As hereinafter fully described, the center-tapped secondary winding 21b supplies operating potential to the switching network 7. Similarly, the secondary windings 21c, 21d, and 21e supply operating potential to the voltage reference network 9, the timer network 3 and the relay circuit 4, respectively.

In a preferred embodiment of the invention, suitable interlocks and other protective devices (not shown), which enhance the safe operation of the unit employing the control circuit, are provided for the primary winding 18a of the transformer. In addition, a power factor correcting capacitor (not shown) is provided across the primary winding 18a of the transformer 18.

Preferably, the transformer 18 is such that a limited current is provided by the secondary winding 18b even when the secondary winding is short circuited. As the load decreases on the secondary winding the current decreases. As shown in the drawing, the secondary winding 18b supplies current to a conventional full wave bridge rectifier 22 whereacross a D.C. potential is developed. The positive output terminal of the full wave rectifier 22 is connected through a grounded conductor 23 which, as hereinafter described, serves as the discharge path for the capacitor bank 6 provided in storage network 5. The negative terminal of the full wave rectifier 22 is connected through a high frequency blocking inductor 26 to the junction of a conductor 27 and a resistor 28. Voltage developed across the rectifier 22 causes a current to flow through the coil 26, a portion thereof flowing to ground through the path provided by the conductor 27, and the remaining portion flowing through the resistor 28 and a plurality of parallely connected bias resistors 29, one each of which is serially connected to each of the capacitors 30 that form the capacitor bank 6. As a result, the capacitors 30 are charged at a generally linear rate.

As illustrated in FIGURE 1, each of the resistors 29 is connected across the ignitor electrode and cathode of one each of a plurality of parallel connected ignitrons 31 which are normally maintained in a nonconductive state until discharge of the capacitor bank 6 is initiated, as hereinafter described. The plates of the ignitrons 31 are connected through a load element 8 and through a conductor 33, which is connected to the capacitor 30, to the grounded conductor 23. The load 8 diagrammatically represents a low impedance work coil that can be utilized to effect magnetic forming operations as taught in the aforementioned United States patent. However, the load may also be electrodes or explosive wire employed in an electrohydraulic forming operation.

The conductor 27 is connected through a normally closed contact 34a of a conventional vacuum switch 34 provided in the relay circuit 4 to the grounded conductor 23. The contact 34a prevents the capacitor 30 from charging until the relay 34 is energized. The conductor 27 is also connected to a voltage divider network that is connected in parallel with the contact 34a. The voltage divider network includes a pair of resistors 36 and 37, the latter of which is connected in parallel with a Zener diode 38. The Zener diode 38 acts as a protecting device for the contact 34a in the event that the resistor 37 opens. One junction of the parallely connected resistor 37 and rectifier 38 is connected to the grounded conductor 23, and the other junction of these elements is connected to a voltage reference terminal 39 whereto a conductor 41 is connected. Preferably, the resistor 36 is substantially larger than the resistor 37 so that only a relatively small portion of the voltage developed across these resistors, which substantially corresponds to the voltage developed across the capacitor bank 6 during charging, is supplied to the reference terminal 39. The conductor 41 supplies the voltage developed at the reference terminal 39 to the switching network 7 through a diode 42 that serves as a blocking element for reverse currents in this conductor 41.

As shown in FIGURE 1 the switching network 7 is connected across the center tapped secondary winding 21b and, more particularly, across the output of a full wave rectifier circuit 43 which is connected across the secondary winding. The rectifier circuit 43 initially develops a positive potential across the input to the switching network between an input terminal 44 and a conductor 46 that is connected between the center tap of the secondary winding 21b and the diode 42. A conventional resistor-capacitor filter network 48 is connected between the terminal 44 and the conductor 46, and a pair of npn transistors 49 and 51 is connected across the filter network.

The transistor 49, which is normally nonconductive, has the base thereof connected to the conductor 46 through a resistor 52 and through a conductor 53 to a selectively adjustable biasing potentiometer 54 provided in the output circuit of the voltage reference network 9. The collector of the transistor 49 is connected through a load resistor 55 to a conductor 56 that is in turn connected through the resistor of the filter network 48 to the positive terminal 44. The emitter of the transistor 49 is biased by connecting the same to the conductor 46 through a biasing resistor 57 and to the conductor 56 through another biasing resistor 58. A capacitor 59, which stabilizes the operation of the switching network 7, is connected between the conductor 46 and the junction of the collector of the transistor 49 with a resistor 60 that is connected to the base of the transistor 51.

The transistor 51 is initially biased so as to maintain the same in a conductive state. In this connection, the emitter of the transistor 51 is connected through a pair of serially connected junction diodes 61 to the conductor 46. The collector of the transistor 51 is connected through a resistor 62 to the conductor 56.

As previously described, the operation of the switching network 7 is, in part, controlled by the voltage reference network 9. That is, the transistor 49 is maintained in a nonconductive state at the beginning of a cycle of operation as a result of the reverse bias that is established across the base-emitter junction of this transistor by the potentiometer 54. More particularly, the secondary winding 21c connected to the input of the voltage reference network 9 is connected to a conventional full wave rectifier 63 which supplies a negative potential through a filter network 64 to a conventional Zener diode 65. When so biased, the Zener diode 65 maintains a substantially constant voltage across the potentiometer 54 and an adjustable calibrating resistor 66 that is connected in series therewith. The position of the tap of the potentiometer 54 which is manually positioned, determines the charge which is accumulated in the capacitor bank 6 before the bank is discharged. The discharge of the capacitor bank 6, after the preselected charge is accumulated, results in a current pulse of the desired magnitude being discharged through the work coil 8.

Irrespective of the setting of the tap, which is shunted by a low pass filter capacitor 67 that precludes the switching circuit from being actuated prematurely, the negative potential picked up thereby initially renders the base of the transistor 49 relatively more negative than the emitter thereof. After the vacuum switch 34 is energized by pressing push button 2 and the contact 34a is opened, the emitter of the transistor 49 is initially more positive than is the base of the transistor 49 since the emitter bias resistor 57 is connected to the conductor 56 through resistor 58. Because the diode 42 normally functions to isolate the transistor 49, this condition is maintained until such time as the voltage developed across the resistor 37 renders the terminal 39 relatively more negative than the base of the transistor 49. This occurs as the capacitor bank 6 becomes charged and as the passage of current flow through the voltage divider network 36–37 and the voltage developed thereacross increases.

When the potential at the reference terminal 39 becomes sufficiently negative so that the transistor 49 is forward biased, the transistor is rendered conductive and collector current flows through the load resistor 55 to divert the base current of the transistor 51. The resulting absence of base current to transistor 51 causes it to become backward biased and thus, nonconductive.

As shown in FIGURE 1, the junction of the resistor 62 with the collector of the transistor 51 is connected through a resistor 71 and a conductor 72 to a first energizing coil of a bistable relay 73 which may be of the mercury wetted type. The other side of the energizing coil of the relay 73, which is hereinafter referred to as the firing coil, is connected by a conductor 74 to the conductor 46 and to one side of a conventional clamping diode 76. The diode 76 is connected to the conductor 72 and then across the firing coil of the relay 73.

As hereinafter described, upon the actuation of the operate push button 2, the second energizing coil, or "set"

coil, of the relay 73 becomes activated, "setting" or closing the normally open contact 73b of the relay 73, which completes a path for energizing current to the coil of the vacuum switch 34. As a result, the normally closed contact 34a opens and the capacitor bank 6 begins to charge. The charging of the capacitor 6 continues until the switching circuit 7 is rendered effective to supply energizing current to the firing coil of the relay 73. When this occurs the energizing circuit to the vacuum switch 34 is opened as a result of the opening of the normally open contact 73b. The vacuum switch 34 is thereby deenergized, and the contact 34a is closed to initiate the discharge of the capacitor bank 6.

More particularly, the operate pushbutton switch 2 is connected through a conductor 78 to the ungrounded side of the secondary winding 21e, across which a full wave rectifier 79 is connected. The full wave rectifier 79 is employed in the relay circuit 4 to supply energizing current to the vacuum switch 32 when the relay 73 is in a "set" condition. In this connection, current flows from the negative terminal of the full wave rectifier 79 through the coil of the vacuum switch 34, through a current limiting resistor 80 and through the normally open contact 73b of the relay 73 back to the positive terminal of the rectifier 79. A contact protector circuit 81 including a series resistor and capacitor, is connected across the normally open contact 73b. A resistor 82 is connected in parallel with the vacuum switch 34 by the normally closed contact 73a to limit the inductive effect of the switch 34.

The relay 73 is "set" upon the actuation of the operate switch 2 and results from variations in the conductive states of various of the components included in the timer network 3. The switch 2 is connected so as to supply alternating current from the secondary winding 21e to a half wave rectifier 83 when the switch is closed. As shown, the half wave rectifier 83 is preferably a semiconductor diode which is connected to a conventional filter network including a resistor 84 and a capacitor 85. The current flowing through the rectifier 83 is limited by a series resistor 86 and is passed to a grounded conductor 87 through the coil of a unistable relay 88, which may be of the mercury wetted type. When energized in this manner, the mercury relay 88 opens up a normally closed contact 88a that forms a portion of a bistable multivibrator circuit generally designated by the numeral 89.

The flip flop, or bistable multivibrator circuit 89, which preferably includes a normally conducting npn transistor 90 and a normally non-conducting npn transistor 91, is connected to the output of a conventional full wave rectifier generally designated by the numeral 92. The rectifier network 92 is connected across the secondary transformer winding 21d and establishes a positive potential at an input terminal 93 and a negative potential at an input terminal 94.

The positive and negative input terminals 93 and 94 and a grounded input terminal 95, whereto the conductor 87 is connected, provide bias currents for the transistors within the timer network 3. In this connection, the emitters of the transistors 90 and 91 are grounded by connecting the same to the grounded conductor 87. The bases of the transistors 90 and 91 are connected through resistors 96 and 97, respectively, to the negative terminal 94. The base of transistor 90 is connected through a resistor 98 and the contacts 88a to the collector of transistor 91, and the base of transistor 91 is connected through a resistor 99 to the collector of transistor 90. Collector current is provided for the transistors 90 and 91 by connecting the same through load resistors 100 and 101 respectively, to the positive terminal 93. To ensure that transistor 90 is initially in the "on" condition, a capacitor 102 is connected between the collector of transistor 91 and the base of transistor 90. When relay 88 is energized, the normally closed contact 88a opens and the flip flop circuit is converted into a monostable multivibrator with the transistor 91 being turned on and the transistor 90 biased off.

The output of the normally on transistor 91 is fed to the base of a npn transistor 103 to normally maintain the same in a non-conducting state. In this connection, the collector of the transistor 90 is connected through a resistor 104 to the base of transistor 103. The base of transistor 103 is negatively biased by connecting the same through a resistor 105 to the terminal 94 and the emitter is grounded by connecting the same to conductor 87. The collector thereof is connected through a series resistor 106 and a parallel network including a diode 107 and a resistor 108 to the positive terminal 93.

As previously indicated, when the transistor 90 is conducting, the negative bias established across the base-emitter junction of the transistor 103 precludes this transistor from conducting. Accordingly, when power is applied to the control circuit, a control capacitor 109 which is connected in series with the "set" coil of the relay 73, charges. Charging current flows from ground 95 through the "set" coil to the plate of the capacitor 109, and from the other plate of the capacitor 109 through the resistor 106 and the diode 107 to the positive terminal 93. Current flow in this direction causes the relay to be in the reset position (firing position) with the normally closed contact 73a in a closed condition.

When the relay 88 is energized by pressing push button 2 and the contact 88a associated therewith is opened, the flip flop 89 switches states thereby initiating the conduction of the transistor 103. As a result, a discharge path for the charge accumulated on the control capacitor 109 is provided (i.e., the positive plate of the capacitor is effectively grounded through the transistor 103). The discharge of the capacitor 109 through the "set" coil of the relay 73 causes this relay to be set. When this occurs, the normally open contact 73b is closed to complete a path for energizing current to the coil of the vacuum switch 34.

As a result, the contact 34a is opened and the charging of the capacitor bank 6 is initiated. The charging of the capacitor bank 6 continues until the potential at the terminal 39 becomes sufficiently positive to render the switching network 7 effective so that energizing current is supplied to the firing winding of the relay 73. When this occurs, the relay 73 is energized to return the contacts 73a and 73b to their original or reset positions and thereby effect the de-energization of the vacuum switch 34. As a consequence, the contact 34a is closed and the dissipation of the charge accumulated within the capacitor bank 6 is initiated. That is, current initially flows through the resistors 29 and ignitors of ignitrons 31, the resistor 28 and through the contact 34a to ground. As a result of this initial discharge of the capacitors 30, a voltage is developed across the resistors 29 and ignitors of ignitrons 31, thereby driving current through said ignitors, which causes the ignitrons 31 to fire. Upon firing, the ignitrons 31 provide an extremely low impedance path to the grounded conductor 23 through the load 8 and the conductor 33. In this connection, the impedance of the conducting ignitrons 31 is substantially less than that of the resistors 28 and 29 in parallel with the ignitors of ignitrons 31 so that substantially all of the discharge current from the capacitor bank 6 flows through these elements and through the low impedance load to ground. As a consequence, the necessary current pulse is thereby produced which results in the desired magnetic field being established by the work coil.

As previously described, it may be desirable to effect the production of a number of successive high amperage current pulses which are shunted to ground, as just described, through the work coil 8. However, in order for these successive puslses to be properly controlled, the timer network 3 includes timing circuitry to ensure that the relay 73 is not set until the capacitor bank 6 has had sufficient time to fully discharge.

In this connection, a n-p-n-transistor 110 is connected in the timer network so as to be normally maintained in a conductive state. The collector of the transistor 110 is connected through a time setting potentiometer 11, a time calibrating potentiometer 112 and a current limiting resistor 113 to the positive input terminal 93. The base of the transistor 110 is connected to the negative terminal 94 through a biasing resistor 114 and also through a base drive resistor 115 to the junction of the load resistor 101 with the collector of the transistor 91. The emitter of the transistor 110 is grounded to terminal 95.

Although normally maintained in a conductive state by the forward bias initially supplied thereto by this circuit arrangement, this transistor is cut off when the conductive state of the multivibrator 89 is changed in response to the energization of the relay 88. More particularly, when the transistor 91 is rendered conductive and the transistor 90 is cut off the forward bias is removed from the transistor 110. Accordingly, at the time the transistor 103 is rendered conductive to allow the discharge of the control capacitor 109, the transistor 110 is cut off and the charging of a time control capacitor 117, which is connected between the collector and emitter of the transistor 110, is initiated.

Charge accumulates on the time control capacitor 117 until a preset quantity is reached whereat a normally nonconductive unijunction transistor 118 is rendered conductive. In this connection the capacitor 117 is connected across the emitter base-one junction of the unijunction transistor 118. Base-one contact is connected to ground through a load resistor 119 and base-two contact is connected to the positive terminal 93 through a temperature compensating resistor 120. When rendered conductive, the unijunction transistor 118 supplies a signal through a plurality of serially connected coupling diodes 121 which signal returns the flip flop circuit 89 and, accordingly, the entire timing network 3 to its initial conductive state. The remaining charge on the time control capacitor 117 will then discharge through the transistor 110 which is conducting, and the control capacitor 109 charges up. If the push button 2 is maintained in a depressed state, the firing sequence is continually repeated.

The period of time required for the necessary charge to accumulate on the time control capacitor 117 is dependent upon the total resistance of the network including the resistors 111, 112 and 113. In this connection, the resistance of the time control resistor 111 is established by an external adjustment of the potentiometer tap provided therefor. As a consequence, the period of time which lapses before the circuit is conditioned to allow successive current pulses to be produced can be selectively controlled by the adjustment of the potentiometer 111.

Although, as outlined above, the circuit readily functions in an accurately controlled manner to produce current pulses it is possible that the adjustment made by the setting on the potentiometer 54 would accommodate too large a storage of energy within the capacitor bank 6. That is, since the voltage setting on the potentiometer 54 normally controls the initiation of a discharge cycle as previously described, it is possible that this setting might be too high for the particular load 8 which is connected in the discharge path. To preclude the possibility of the load 8 being damaged the protective network 10 causes the premature discharge of the capacitor bank 6. The protective network 10 includes the secondary winding 18c which is closely coupled to the secondary winding 18b so as to indicate the current being supplied by the winding 18b. The voltage developed across the secondary winding 18c supplies an auto-transformer or Variac 122. The Variac 122, which is selectively adjustable, is connected through a rectifier 123 to the overvoltage protection relay 20. A Zener diode 124, connected in series with the relay 20, prevents the same from being energized until the voltage developed by the Variac 122 exceeds a predetermined voltage.

The autotransformer 122 is initially set to a maximum value corresponding to the capacity of the load 8. Accordingly, should an error occur in the setting on the potentiometer 54 the autotransformer 122 which senses the voltage buildup in the energy storage network will supply energizing current to the overvoltage protection bistable relay 20 which may be a mercury wetted type and render this relay effective. When this occurs, power input to the control circuit is cut off as a result of the opening of the relay contact 20a and the energy within the storage network is prematurely discharged to ground. Once such a protective operation has taken place the relay 20 is reset by the actuation of a push-button switch 125 associated therewith which completes a path for current from the terminal 93 to ground, which current flow resets the relay 20.

As can be seen from the above a control circuit is provided which automatically charges a capacitor bank to a preselected level and then discharges the same through a forming coil of a magnetic forming device. If the preselected level is above the safe level of operation of the forming coil, the control circuit prematurely discharges the capacitor bank. The control circuit can be constructed so as to occupy a relatively small volume.

FIGURE 2 shows an embodiment of the control circuit which is particularly adapted for modular construction of the capacitor bank. In this connection, a plurality of similar modules are provided, two of which are shown in FIGURE 2 and are indicated by reference numerals 130a and 130b. Each of the modules is capable of storing a predetermined amount of energy. Additional modules may be connected in or disconnected from the control circuit as required by the application.

In the circuit shown in FIGURE 2, elements similar to those shown in FIGURE 1 are indicated with the same reference numeral with the superscript prime ('). A charging cycle is initiated in the circuit by depressing the push button operated switch 2' which energizes the timing circuit 3'. The timing circuit, in turn, actuates the relay circuit 4' thereby energizing relay 34', which relay has a pair of normally open contacts 34b and 34c.

The closure of the contact 34b results in energy being supplied to charge the capacitor banks in the respective modules 130a and 130b. In this connection, upon closure of relay contact 34b alternating current is supplied to the primary winding 18a' of the current limiting transformer 18'. The secondary winding 18b' of the transformer 18' is connected to a diode bridge circuit 22', the output of which is filtered by a series resistor 140 and a parallel timing capacitor 142. As shown, the negative side of the capacitor 142 is grounded.

The filtered output of the diode bridge circuit 22' is supplied through a normally open contact 144a of a diode bridge protecting relay 144 to the modules 130a and 130b connected in parallel thereto at a positive junction 146 and a grounded junction 148. The normally open contact 144a, the purpose of which is described hereinafter, is closed upon energization of the bridge protecting relay 144, which relay 144 is energized upon the closure of the normally open contact 34c.

Since all of the modules are similar in construction, only one of the modules is described hereinafter in detail. The positive junction 146 is connected through a normally open contact 150a of a module engage relay 150 to one side of parallel connected resistor 152 and a forward connected diode 154. The module engage relay 150 is energized by depressing a module engaging push button 156. The parallel connected resistor 152 and diode 154 minimize outward flow of energy stored in the one module to the other parallel connected modules in the event of a misfire or other troubles.

As shown in FIGURE 2, the other respective sides of the resistor 152 and diode 154 are coupled to a common connection of three charge limiting resistors 29'. One each of the resistors 29' is serially connected to each of the capacitors 39' that form the capacitor bank. The other sides of the capacitors 39' are connected through a common by-pass resistor 158 to the grounded junction 148. The load 8' is coupled in parallel with the by-pass resistor 158. Thus, when the module is connected in the circuit (i.e., by depressing push button 156) electrons flow through the load 8', if the load is of low impedance (e.g., a coil used for magnetic forming or an explosive wire or spark gap) to one side of the capacitors 30'. In the event the load is disconnected, such as if the coil or bridge wire are not positioned, the electrons flow through the by-pass resistor 158.

As the energy stored in the capacitors 30' increases, there is a corresponding increase in the voltage developed across a charge sensing resistor 160 coupled between the positive junction 146 and the grounded junction 148. A portion of this charge indicating voltage is coupled to the switching circuit 7' wherein the charge indicating voltage is compared with the reference voltage supplied by the voltage reference network 9'. The voltage reference network 9' and the switching circuit 7' are similar to those shown in FIGURE 1 except that the connections of the reference voltage and the charge indicating voltage to the switching circuit 7' are reversed. That is, the charge voltage is coupled to the base of transistor 49' and the reference voltage is coupled to the diode 42'.

When the energy stored in the capacitor bank 30' reaches the desired level, the discharge of the capacitor bank is initiated after a predetermined delay. This delayed firing insures that the diode bridge circuit 22' is disconnected prior to firing. In this connection, at a preselected level of the charge indicating voltage the relay 34' is deenergized, opening relay contacts 34b and 34c which respectively disconnect the AC power and de-energize the bridge protecting relay 144. The bridge protecting relay 144 is a delayed dropout type and hence relay contact 144a opens after power is removed from the transformer 18'. This delayed opening insures that the relay contact 144a does not interrupt a high charging current.

After the relay contact 144a opens, the timing capacitor 142 discharges through a timing resistor 162 coupled across the timing capacitor 142. A portion of the voltage developed across the timing resistor 162 is amplified by an amplifier 164, the output of which is coupled to a relay 166. During the charging cycle, sufficient voltage is developed across the timing resistor 162, to energize the relay 166. At a predetermined time after the relay contact 144a opens, the relay 166 is de-energized thereby closing its normally closed contact 166a. The closing of the relay contact 166a energizes a firing relay 168 connected in series therewith, thereby closing the normally open contact 168a of the firing relay.

The closing of the firing relay contact 168a applies a positive pulse to the ignitor electrodes of the ignitrons 31', which ignitrons are connected between the positive sides of the capacitors 30' and ground, to initiate discharge of the capacitors 30' through the load 8'. In this connection the ignitor electrodes of the ignitrons 31' are connected through series resistors 170 to a common conductor 171. The common conductor 171 is connected through a normally open contact 150b of the module engage relay 150 to one side of a capacitor 172. The normally open contact 150b is closed when the module 139 is in the circuit. When the module is disconnected from the circuit the common conductor is connected to ground through a normally closed contact 150c of the module engaged relay 150.

The other side of the capacitor 172 is connected to a junction between a negative DC supply line 174 and one side of the firing relay contact 168a. The other side of the firing relay contact 168a, as well as the positive DC supply line 176, is connected to ground. Thus, since the firing relay contact 168a is open during the charging of the capacitors 30', a negative charge is developed on the side of the capacitor 172 coupled to the negative supply line 174. When firing relay contact 168a closes, a positive pulse is applied to the ignitor electrodes, causing the ignitrons 31' to conduct, and discharging the capacitors 30' through the load 8'.

In the circuit shown in FIGURE 2, means are provided for dissipating the accumulated charge on capacitors 30' in the event that the power supplied thereto is interrupted, as by opening the start switch, or by power line failure, or by excessive voltage (explained hereinafter), etc. In this connection the normally open dumping relay contact 178a is serially connected to a high power dumping resistor 179 and the series combination is connected between the common connector to the resistors 29' and ground. Dumping relay contact 178a is opened by energizing of dumping relay 178, which is energized during normal operation of the control circuit by connecting the same in series with a normally open module contact 150d and a power source 180. Relay contacts (not shown) are provided in the power source for interrupting the power supplied to the dumping relay in the event that the power supplied to the capacitor bank is interrupted. In such an event, the dumping relay 178 de-energizes, closing the dumping relay contact 178a thereby providing a discharge circuit for the energy stored in the capacitors 30'.

As previously indicated, the dumping relay is also de-energized by excessive voltage being applied to the capacitor bank. This is accomplished by employing the protective network 10', which is generally similar to the protective network 10 described above in connection with FIGURE 1. In FIGURE 2, however, the tap of the autotransformer 122' is mechanically connected to the tap of the voltage reference 54'. The taps are arranged so that the protective circuit is operated at a predetermined voltage above the reference setting (e.g. 10 percent excess voltage).

As previously indicated, the other module is generally the same as the above described module, and is connected in parallel therewith. Additional modules may be provided as required by the application. The number of modules which are desired for a particular application may be selected by merely actuating the module engage push button associated with the respective modules.

As can be seen from the above, FIGURE 2 shows a circuit which is particularly adapted for modular construction, the modules being engaged as desired. In this circuit, the capacitors are isolated from ground. This enables the cathodes of the ignitrons to be grounded for water cooling and for isolation of the ignitrons from each other and from the charging circuit.

Various changes and modifications may be made in the above described control circuit without departing from the spirit or scope of the present invention.

Various features of the invention are set forth in the accompanying claims.

What is claimed is:

1. A circuit for controlling the selective charging and discharging of a capacitor, comprising a capacitor, a source of direct current, switch means for selectively applying the output of said source to said capacitor for charging the same, first means responsive to the potential developed across said capacitor by the energy accumulated therein for discharging the same through a load when a preselected potential is reached, and second means responsive to the potential developed across the capacitor for prematurely discharging the same before the energy accumulation exceeds that which can be safely dissipated by the load.

2. A circuit for controlling the selective charging of a capacitor and the discharging of the same through a load, which circuit comprises a current limiting transformer, a rectifier connected to an output of said transformer, a capacitor, first switch means for selectively applying the output of said rectifier to the capacitor, second switch means responsive to the operation of said first switch means after said capacitor is charged for selectively coupling a load across the capacitor, means responsive to the potential developed across said capacitor by the energy accumulated therein for operating said first switch means when the potential reaches a preselected value, and means responsive to another output of said transformer indicative of the potential developed across the capacitor for prematurely discharging the same before the energy accumulation exceeds that which can be safely dissipated by the load.

3. A circuit for controlling the selective charging of a capacitor and the discharging of the same through a load, which circuit comprises a current limiting transformer having a primary winding, a first secondary winding and a second secondary winding responsive to the voltage attained by the first secondary winding, an energy storage network including a rectifier coupled across said first secondary winding, a capacitor, first switch means for selectively applying the output of said rectifier to said capacitor, and second switch means responsive to the operation of said first switch means after said capacitor is charged for selectively connecting a load across the capacitor, means responsive to the potential developed across the capacitor for operating said first switch means when the potential reaches a preselected value, and a protective network for prematurely discharging said capacitor if an unsafe level is reached, said network including an autotransformer coupled across the second secondary winding, a relay having a normally closed contact, a rectifier and a Zener diode, said rectifier, said Zener diode, and said relay being connected in series across the output of said autotransformer, the normally closed relay contact of said relay being coupled to the primary winding so that when said second bistable relay is energized current to said primary winding is interrupted.

4. A circuit for controlling the selective charging of a capacitor and the discharging of the same through a load, which circuit comprises a current limiting transformer having a primary winding, a first secondary winding and a second secondary winding responsive to the voltage attained by the first secondary winding, an energy storage network including a rectifier coupled across said first secondary winding, a capacitor, first switch means for selectively coupling said capacitor to the output of said rectifier upon the opening thereof, and second switch means responsive to the closure of said first switch means after said capacitor is charged for selectively coupling a load across the capacitor, an indicating resistor coupled across said first switch means for providing a firing potential indicative of the potential developed across said capacitor when said first switch means is open, a voltage reference network for establishing the potential at which said capacitor discharges, said voltage reference network including a first source of DC voltage having one side thereof grounded, and an adjustable potentiometer coupled across said source, the reference potential being developed between ground and the tap of the potentiometer, a switching network for comparing the reference potential and the firing potential, said network including a DC amplifier circuit, the reference potential being coupled to said amplifier circuit so as to bias the input stage of said amplifier to a non-conductive state, means connecting said indicating resistor to said DC amplifier circuit so that the firing potential biases the input stage of the amplifier circuit toward a conductive state, and a firing coil of a first bistable relay coupled to the output of said DC amplifier circuit, whereby said firing coil is energized when the firing potential exceeds the reference potential, said first bistable relay having a normally open contact which is coupled to said first switch means so as to close said first switch means when said contact opens, and a timing circuit for ensuring that the capacitor is fully discharged before said capacitor is again charged, said timing circuit including a second source of DC potential, an operate switch, a relay having a normally closed contact, a normally bistable multivibrator circuit having means to ensure operation thereof in one state when power is supplied to said control circuit, the normally closed contact of said relay being coupled to said bistable multivibrator circuit so that said bistable circuit is switched to the other state of operation and is converted into a monostable multivibrator circuit when said relay is energized, a further capacitor, a third source of DC potential, a reset coil of said first bistable relay coupling one side of said further capacitor to ground, the other side of said further capacitor being coupled to said third source of DC potential, a third switch means responsive to the operation of said monostable multivibrator circuit to couple the other side of said further capacitor to ground when said monostable multivibrator is switched to the other state, thereby energizing said reset coil and closing said normally open contact, an R-C time constant circuit, means responsive to the operation of said monostable multivibrator circuit for energizing said time constant circuit when said monostable multivibrator circuit is switched to the other state of operation, and means responsive to the potential developed across said time constant circuit for preventing said monostable multivibrator from switching back to said one state until a preselected potential is established by said time constant circuit.

5. A circuit for controlling the selective charging of a capacitor and the discharging of the same through a load, which circuit comprises a current limiting transformer having a primary winding, a first secondary winding and a second secondary winding responsive to the voltage attained by the first secondary winding, an energy storage network including a rectifier coupled across said first secondary winding, a capacitor, first switch means for selectively coupling said capacitor to the output of said rectifier upon the opening thereof, and second switch means responsive to the closure of said first switch means after said capacitor is charged for selectively coupling a load across the capacitor, an indicating resistor coupled across said first switch means for providing a firing potential indicative of the potential developed across said capacitor when said first switch means is open, and a voltage reference network for establishing the potential at which said capacitor discharges, said voltages reference network including a first source of DC voltage having one side thereof grounded, and an adjustable potentiometer coupled across said source, the reference potential being developed between ground and the tap of the potentiometer, a switching network for comparing the reference potential and the firing potential, said network including a DC amplifier circuit, the reference potential being coupled to said amplifier circuit so as to bias the input stage to a non-conductive state, means connecting said indicating resistor to said DC amplifier circuit so that the firing potential biases the input stage of the amplifier circuit toward a conductive state, and a relay coupled to the output of said DC amplifier circuit, whereby said relay is energized when the firing potential exceeds the reference potential, said relay having a normally open contact which is coupled to said first switch means so as to close said first switch means when said contact closes.

6. A circuit for controlling the selective charging of a capacitor and the discharging of the same through a load, which circuit comprises a current limiting transformer having a primary winding, a first secondary winding, and a second secondary winding responsive to the voltage attained by the first secondary winding, an energy storage network including a rectifier coupled across said first secondary winding, a capacitor having one side grounded and coupled to one of the output terminals of the rectifier, a biasing resistor coupled between the other output terminal of said rectifier and the other side of the capacitor, an Ignitron having a plate, cathode and ignitor, said cathode being coupled to the other side of said capacitor, the plate being coupled to one side of a load, the other side of the load being coupled to ground, and a normally closed contact of a firing relay coupled across the output of said rectifier for normally coupling the output thereof to ground, an indicating resistor coupled across said contact for providing a firing potential indicative of the potential developed across said capacitor when said firing relay contact is open, a voltage reference network for establishing the potential at which said capacitor discharges, said voltage reference network including a first source of DC voltage having one side thereof grounded, and an adjustable potentiometer coupled across said source, the reference potential being developed between ground and the tap of the potentiometer, a switching network for comparing the reference potential and the firing potential, said network including a DC amplifier circuit, the reference potential being coupled to said amplifier circuit so as to bias the input stage to a non-conductive state, means connecting said indicating resistor to said DC amplifier circuit so that the firing potential biases the input stage of the amplifier circuit toward a conductive state, and a firing coil of a first bistable relay coupled to the output of said DC amplifier circuit, whereby said firing coil is energized when the firing potential exceeds the reference potential, said first bistable relay having a normally open contact, a vacuum switch circuit for energizing said firing relay, said relay circuit including a second source of DC potential, said normally open contact of said first bistable relay and said firing relay being coupled in series with said second source of DC potential, a timing circuit for ensuring the capacitor is fully discharged before said capacitor is again charged, said timing circuit including a third source of DC potential, an operate switch, a unistable relay having a normally closed contact, said operate switch and said unistable relay being coupled in series with said third source of DC potential, a normally bistable multivibrator circuit having means to ensure operation thereof in one state when power is supplied to said control circuit, the normally closed contact of said unistable relay being coupled to said bistable multivibrator circuit so that said multivibrator circuit is switched to the other state of operation and is converted into a monostable multivibrator circuit when said unistable relay is energized, a further capacitor, a fourth source of DC potential, a "set" coil of said first bistable relay coupling one side of said further capacitor to ground, the other side of said further capacitor being coupled to said fourth source of DC potential, a switch means responsive to the operation of said multivibrator circuit to couple the other side of said further capacitor to ground when said multivibrator is switched to the other state, thereby energizing said "set" coil and closing said normally open contact, an R-C time constant circuit, means responsive to the operation of said multivibrator circuit for energizing said time constant circuit when said multivibrator circuit is switched to the other state of operation, and means responsive to the potential developed across said time constant circuit for preventing said multivibrator from switching back to said one state until a preselected potential is established by said time constant circuit, and a protective network for prematurely discharging said capacitor if an unsafe level is reached, said network including an autotransformer coupled across the second secondary winding, a relay having a normally closed contact, a rectifier and a Zener diode, said rectifier, said Zener diode and said relay being connected in series across the output of said autotransformer, the normally closed relay contact of said relay being coupled to a coil of a power contactor which further is coupled to the primary winding so that when said bistable relay is energized current to said primary winding is interrupted by said power contactor.

7. A control circuit comprising a plurality of modules, each of which includes at least one capacitor, a first resistor having one side thereof coupled to one side of the capacitor, the other side of the capacitor being coupled to one side of a load, the other side of the load being grounded, a first disconnect switch having one side connected to the other side of the resistor, an ignitron having its plate coupled to one side of the capacitor and its cathode coupled to ground, and a second disconnect switch having one side connected to the ignitor electrode of the ignitron, a dumping resistor, a dumping relay having a normally closed contact, said normally closed contact and said dumping resistor being coupled between the other side of said first resistor and ground, and a third disconnect switch coupled in series with said dumping relay, a source of direct current, switch means for selectively applying the positive output of said source to the other side of the first switch and the negative output thereof to ground, means responsive to the application of power to said direct current source for supplying power to said serially connected dumping relay and third switch, and means responsive to the potential developed across said capacitor by the energy accumulated therein and connected to the other side of the second switch for rendering the ignitron conductive when a preselected potential is reached.

8. A circuit for controlling the selective charging of a capacitor and the discharging of the same through a load, comprising an energy storage capacitor switchably coupled to the load, a direct current power supply, first switching means for applying the output of said power supply to said capacitor to supply a charge thereto, second switching means responsive to the potential developed across the capacitor for causing the discharge thereof to said load when said potential is at a predetermined value, variable reference means coupled to said second switching means for selectively controlling the value of said predetermined potential to control the amount of energy in said capacitor for discharge, and timing means coupled to said first switching means for delaying subsequent operation thereof for a period sufficient to permit substantially complete discharge of said capacitor.

9. The circuit of claim 8 comprising further means responsive to the potential developed across said capacitor for prematurely discharging the same before the energy accumulation exceeds that which can be safely dissipated by the load, said further means being operative independently of the selected value of said variable reference means.

10. The circuit of claim 8 wherein said second switching means includes a switching network responsive to the potential developed across said capacitor for providing an output signal indicative of said predetermined potential being developed thereacross, and an ignitron responsive to said output signal connected in circuit relation with said capacitor and the load and defining a discharge path for said capacitor, said ignitron being conductive in response to said output signal to discharge said capacitor through the load.

11. The circuit of claim 10 further comprising resistance means connected in circuit relation with said capacitor and said second switching means for defining another discharge path for said capacitor, said resistance means developing a potential thereacross of magnitude and polarity capable of firing said ignitron in response to the output signal of said switching network, and means for applying the potential across said resistance means to the ignitron ignitor.

12. A circuit for controlling the selective charging of a capacitor and the discharging of the same through a load, comprising an energy storage capacitor switchably coupled to the load in a first discharge circuit, a direct current power supply, switching means having a first condition wherein the output of said power supply is applied to said capacitor to supply a charge thereto, and a second condition wherein said capacitor is connected into a second discharge circuit, an electronic network coupled to said switching means and responsive to the potential developed across said capacitor for providing an output signal indicative that a predetermined potential is developed thereacross, said switching means being activated to said second condition from said first condition in response to said signal, and said second discharge circuit comprising means resopnsive to the activation of said switching means for discharging the capacitor through the load in said first discharge circuit.

13. The circuit of claim 12 wherein said electronic network includes variable reference means for selectively controlling the value of said predetermined potential to control the amount of energy in said capacitor for discharge, and timing means for delaying subsequent operation of said switching means to said first condition from said second condition for a period sufficient to permit substantially complete discharge of said capacitor.

14. The circuit of claim 13 further comprising means responsive to the potential developed across said capacitor for prematurely discharging the same before the energy accumulation exceeds that which can be safely dissipated by the load, said further means being operative independently of the selected value of said variable reference means.

15. A control circuit, comprising a capacitor bank including at least one capacitor, a resistor having one side thereof coupled to one side of the capacitor, the other side of the capacitor being coupled to one side of a load, a source of direct current, switch means for selectively applying the output of said source to the other side of the resistor and the other side of the load for charging the capacitor, a discharge device coupled between said one side of the capacitor and said other side of the load for discharging the capacitor through the load when said discharge device is rendered conductive, and means responsive to a predetermined potential developed across said capacitor by the energy accumulated therein for initiating a discharge current therefrom through a first circuit path, and means responsive to said discharge current for rendering the discharge device conductive at said predetermined potential to discharge the capacitor to the load through a second circuit path.

16. A control circuit comprising a capacitor bank including at least one capacitor, a resistor having one side thereof coupled to one side of the capacitor, the other side of the capacitor being coupled to one side of a load, the other side of the load being grounded, a source of direct current, switch means for selectively applying the positive output thereof to the other side of the resistor and the negative output thereof to ground, an ignitron having its plate coupled to said one side of the capacitor and its cathode coupled to ground, and means responsive to a predetermined potential developed across said capacitor by the energy accumulated therein for initiating a discharge current therefrom through a first circuit path, said first circuit path including means responsive to said discharge current for rendering the ignitron conductive at said predetermined potential to discharge the capacitor to the load through a second circuit path.

17. A control circuit adapted for modular construction wherein a common supply source of direct current potential and a firing circuit are provided, characterized in that a plurality of storage units are provided for causing a high amperage short duration pulse of direct current to flow through a load, each of said storage units includes a storage network, a discharge means having a control element connected in series with said storage network and said load so as to provide a selectively actuated low impedance path for the discharge of said storage network through said load, a rectifier connected in series with said storage network and said supply source so as to provide a low resistance path to current flowing to said network and to resist current flowing from said network, and disconnect switch means for selectively connecting said series connected rectifier and storage network to said source and said control element to said firing circuit, said rectifier preventing discharge of said storage network through another storage unit should the latter malfunction.

18. A control circuit in accordance with claim 17 characterized in that each of said storage units includes discharge switch means connected in parallel with said storage network, said discharge switch means providing a relatively low impedance discharge path across its respective storage network when the respective storage unit is deactuated.

19. A control circuit comprising a plurality of modules, each of which includes at least one capacitor, a resistor having one side thereof coupled to one side of the capacitor, the other side of the capacitor being coupled to one side of a load, the other side of the load being grounded, a first disconnect switch having one side connected to the other side of the resistor, an ignitron having its plate coupled to one side of the capacitor and its cathode coupled to ground, a second disconnect switch having one side connected to the ignitor electrode of the ignitron, a source of direct current, switch means for selectively applying the positive output thereof to the other side of the first switch and the negative output thereof to ground, means responsive to the potential developed across said capacitor by the energy accumulated therein and connected to the other side of the second switch for rendering the ignitron conductive when a preselected potential is reached, and means coupled to said disconnect switches for activating and de-activating each and any of said modules at will, whereby the current discharged through the load may be selectively varied.

References Cited

UNITED STATES PATENTS

| | | | |
|---|---|---|---|
| 2,473,915 | 6/1949 | Slepian et al. | 219—113 X |
| 2,537,990 | 1/1951 | Graham | 219—113 |
| 2,999,208 | 9/1961 | Ruehlemann | 320—1 X |

BERNARD KONICK, *Primary Examiner.*

J. BREIMAYER, *Assistant Examiner.*